(12) United States Patent
Loui et al.

(10) Patent No.: US 7,191,725 B2
(45) Date of Patent: *Mar. 20, 2007

(54) BOW LIFTING BODY

(75) Inventors: Steven Loui, Honolulu, HI (US); Troy Keipper, Honolulu, HI (US); Gary Shimozono, Kapolei, HI (US); Scott Yamashita, Honolulu, HI (US)

(73) Assignee: Navatek, Ltd., Honolulu, HI (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/336,812

(22) Filed: Jan. 23, 2006

(65) Prior Publication Data

US 2006/0169191 A1    Aug. 3, 2006

Related U.S. Application Data

(63) Continuation-in-part of application No. 10/834,930, filed on Apr. 30, 2004, now Pat. No. 7,004,093.

(60) Provisional application No. 60/714,359, filed on Sep. 7, 2005.

(51) Int. Cl.
*B63B 1/24* (2006.01)

(52) U.S. Cl. ..................................... 114/274; 114/67 R

(58) Field of Classification Search ............. 114/61.12, 114/61.27, 61.29, 61.3, 67 R, 126, 274
See application file for complete search history.

(56) References Cited

U.S. PATENT DOCUMENTS

| | | | |
|---|---|---|---|
| 3,157,145 A | 11/1964 | Farris | 114/332 |
| 3,347,197 A | 10/1967 | Scherer | 114/66.5 |
| 3,429,287 A | 2/1969 | Uram | 114/278 |
| 3,885,514 A | 5/1975 | Lauenborg | 114/228 |
| 3,947,906 A | 4/1976 | McLane | 114/332 |
| 4,003,325 A * | 1/1977 | Allen | 114/61.27 |
| 4,776,294 A * | 10/1988 | Childs | 114/126 |
| 4,819,576 A | 4/1989 | Shaw | 114/274 |
| 4,919,063 A | 4/1990 | Hall et al. | 114/61.14 |
| 4,981,099 A | 1/1991 | Holder | 114/274 |
| 5,046,444 A | 9/1991 | Vorus | 114/274 |
| 5,433,161 A | 7/1995 | Loui | 114/61.14 |
| 5,477,798 A | 12/1995 | Ness | 114/65 |
| 5,522,333 A | 6/1996 | Lang et al. | 114/61.12 |
| 5,544,610 A | 8/1996 | Harding | 114/312 |
| 5,645,008 A | 7/1997 | Loui | 114/274 |
| 5,694,878 A * | 12/1997 | Masuyama | 114/61.12 |
| 5,794,558 A | 8/1998 | Loui | 114/274 |
| 6,263,819 B1 | 7/2001 | Gorustein et al. | 114/61.3 |
| 6,604,484 B2 * | 8/2003 | Burg | 114/274 |
| 7,004,093 B2 * | 2/2006 | Loui et al. | 114/61.3 |

* cited by examiner

*Primary Examiner*—Lars A. Olson
(74) *Attorney, Agent, or Firm*—Fitzpatrick, Cella, Harper & Scinto

(57) ABSTRACT

A watercraft having a hull, a fore and aft longitudinal axis and a bow includes a three dimensional low drag submerged lifting body secured to the bow below the design waterline of the hull.

23 Claims, 8 Drawing Sheets

BOW LIFTING BODY

This application claims the benefit of U.S. Provisional Application No. 60/714,359 filed Sep. 7, 2005 and is a continuation-in-part of U.S. patent application Ser. No. 10/834,930 filed Apr. 30, 2004 now U.S. Pat. No. 7,004,093.

FIELD OF THE INVENTION

The present invention relates to ships and watercraft having improved efficiency and seakeeping from underwater submerged displacement hulls secured to the watercraft below its design waterline to act as a lifting body.

BACKGROUND OF THE INVENTION

In recent years a so-called Mid-Foil SWAS vessel was developed, as disclosed in U.S. Pat. No. 5,794,558, which uses a submerged underwater displacement hull or lifting body to provide lift to the craft in conjunction with any other parts of the vessel which generate lift. The lifting body differs from a hydrofoil in that the enclosed volume of the lifting body provides significant displacement or buoyant lift as well as hydrodynamic lift, whereas the lift of a hydrofoil is dominated by only hydrodynamic lift. In the course of continuing development work, the particular shape of such lifting bodies was studied in detail in order to improve their performance and adapt and integrate their use to a wide range of marine craft.

More specifically, as disclosed in U.S. Pat. No. 6,263,819, it was found that the submerged bodies of marine vessels, when operated at shallow submergence depths, such as is the case for SWAS and Mid-Foil vessels, can be adversely effected by the displacement of the free water surface caused by the body's volume and dynamic flow effects. The interaction of that displacement of the free surface relative to the body's shape had not been adequately accounted for in the prior art structures. It is believed that this inadequacy of existing prior art submerged bodies for marine vessels is the result of the fact that submerged and semi-submerged marine vessels have historically been designed to operate at great depths relative to their underwater body thickness, as with submarines or hydrofoils.

A typical submarine is essentially a body of revolution-shaped hull which has three dimensional waterflow about it, but which is designed to operate normally several hull diameters or more below the free water surface. Thus, the displacement of the free surface of the water by operation of the hull at such depths is minimal and does not effect the operation of the vessel. On the other hand, hydrofoils are simply submerged wings with predominately two-dimensional flow and are designed typically to produce dynamic lift as opposed to buoyant or hydrostatic lift.

The displacement of water at the free surface by a submerged body is detrimental to a marine vessel's hydrodynamic performance with the impact varying as a function of the body's shape, submergence depth, speed and trim. For example, the free surface effects can significantly reduce lift in the body or even cause negative lift (also referred to as sinkage) to occur. Resistance to movement through the water by free surface effects is generally greater than if the submerged hull were operating at great depths; and pitch movements caused by the displacement of the free water surface vary with speed and create craft instability.

According to the teachings of U.S. Pat. No. 6,263,819 (hereinafter the "'819 patent"), these problems are overcome by a low drag underwater submerged displacement hull defined from two parabolic shapes. The periphery of the hull when viewed in plan is symmetrical and defined by a first parabolic form (or parabolic equation) with the form defining the leading edge of the hull. The longitudinal cross-section of the hull is formed of foil shaped cross-sections which are defined as cambered parabolic foils having a low drag foil shape and providing a generally parabolic nose for the hull. Generally, each longitudinal cross-section of the hull parallel to the longitudinal or fore and aft axis of the hull has a symmetrical cambered parabolic foil shape with the cross-section along the longitudinal axis of the hull having the maximum thickness and the cross-section furthest from the centerline of the hull having the minimum thickness. In plan, the hull has a stem or trailing edge which is defined by either a straight line, a parabolic line, or a straight line fared near its ends to the side edges of the plan parabola shape.

It is an object of the present invention to provide a submerged lifting body which can be employed on the bow of various marine vessels to maximize performance of the vessel by creating a high lift to drag ratio (L/D), i.e., low drag, at operational speed.

Another object of the present invention is to provide a submerged lifting body for use on the bow of various marine vessels which improves performance of the vessel at operational speed while creating a dynamically stable vessel.

Yet another object of the present invention is to provide submerged lifting bodies for use on the bow of various marine vessels which can increase the efficiency of these vessels by reducing hydrodynamic drag.

A still further object of the invention is its increase in the efficiency of a ship's hull through use of a bow mounting lifting body.

SUMMARY OF THE INVENTION

In accordance with an aspect of the present invention, an underwater lifting body is provided that meets these objectives. In particular a lifting body of the general type described in U.S. Pat. No. 6,263,819 is secured to the bow of a watercraft hull below the vessel's design water line for improved efficiency and motions in a seaway. Such bow attached lifting bodies are referred to herein as a Bow Lifting Body or BLB.

It has been found that a BLB applied at the bow of a ship can introduce numerous positive attributes.

A BLB provides all the positive attributes of a traditional bulbous bow. However, wave cancellation similar to a traditional bulbous bow is provided by a BLB, in an even larger speed range. Also, because of its volume, a BLB can be used for ballast or as a sonar dome, similar to traditional bulbous bows.

In the early $20^{th}$ century, D. W. Taylor developed the bulbous bow which has become a standard feature on modern ships. The battleship USS Delaware exhibited the first such bulbous bow in 1907. These bulbous protrusions are typically mounted at or slightly below the vessel's design waterline and various shapes have been developed over the years. These shapes are generally a cylindrical bulbous torpedo shape as shown in FIG. 3, conical as shown in FIG. 4, teardrop as shown in FIG. 5 or hybrid as shown in FIG. 6.

After Taylor discovered the bulbous bow and its potential to reduce a ship's drag at a specific speed, in 1935–36 Wigley performed calculations to quantify the resistance benefits of bulbous bows due to wave cancellation.

At high speeds, the reduction in wave resistance due to the interference between the wave systems of the hull and bulb, if properly located, is more than sufficient to overcome the frictional and form drag of the bulb, and the net result is a reduction in total resistance.

J D Van Manen and P Van Oossaney, Chapter 5, Volume II, *Principles of Naval Architecture*

As seen in FIGS. 3–6, traditional bulbous bows exhibit a shape that is symmetric about a longitudinal axis. Because of this symmetric shape, bulbous bows offer no dynamic lift at speed and increase drag and decrease efficiency over a range of speeds due to the fact that bulbous bows exhibit a certain amount of sinkage at speed. However conventional bulbous bows do have the positive attribute of wave cancellation which occurs in a specific speed range that is dependent on the length and beam of the hull as well as the length, size and location of the bulbous bow. This phenomenon is shown in FIGS. 1 and 2, FIG. 1 demonstrates the separate wave patterns 10, 12 on the free water surface generated by a conventional hull and a schematically illustrated conventional bulbous bow structure 13 operating below the surface. The hull produces a wave peak 14 aft of bow 16 while the bulbous bow 18 creates a wave peak 20 immediately above it followed by a trough 22. The trough 22 cancels wave peak 14 so a wave 24 of reduced height is formed. (FIG. 1) The size and placement of the bulbous bow is crucial to optimizing the ship's performance at a desired speed. However, because this increased efficiency with a bulbous bow is for one specific speed, generally cruise speed, all other speed ranges exhibit an increase in amount of drag and reduction in efficiency.

Because lifting bodies have a higher lift to drag ratio (L/D, efficiency) than that of a hull alone, most noticeably at high speeds, by adding a BLB component with a higher L/D ratio than that of the original system without such an addition, it is intuitive that the L/D ratio of the entire system increases.

In addition, a typical lifting body can lift as much as five (5) times its own displacement at speed. By adding a lifting body at the bow of a ship, this dynamic lift increases the payload capacity of the ship. A BLB with a high L/D ratio can introduce such possibilities as the option to shift the longitudinal center of gravity (LCG) toward the bow of the ship by means of adding fuel, payload, ballast tanks or similar. This shift in LCG can be desirable in certain seaways to reduce pitching motions.

Furthermore, by the introduction of an underwater body with a large platform area at the bow of a ship, the added mass in the vertical direction is increased, which significantly reduces unwanted motion.

Moreover, the motions of the ship in a seaway can be additionally reduced if the underwater body has active control surfaces which are linked to an Active Ride Control System (ARCS). A BLB offers the option of either being a passive, or active ride control device.

The above, and other objects, features and advantages of this invention will be apparent to those skilled in the art from the following detailed description of illustrative embodiments of the invention which is to be read in connection with the accompanying drawings wherein:

DETAILED DESCRIPTION

Figure 1:
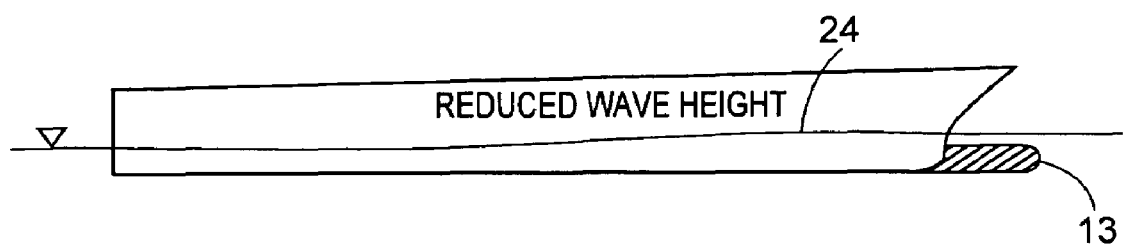
FIG. 1 is a schematic elevational view of a ship's hull having a traditional bulbous bow of the prior art.
Figure 2:
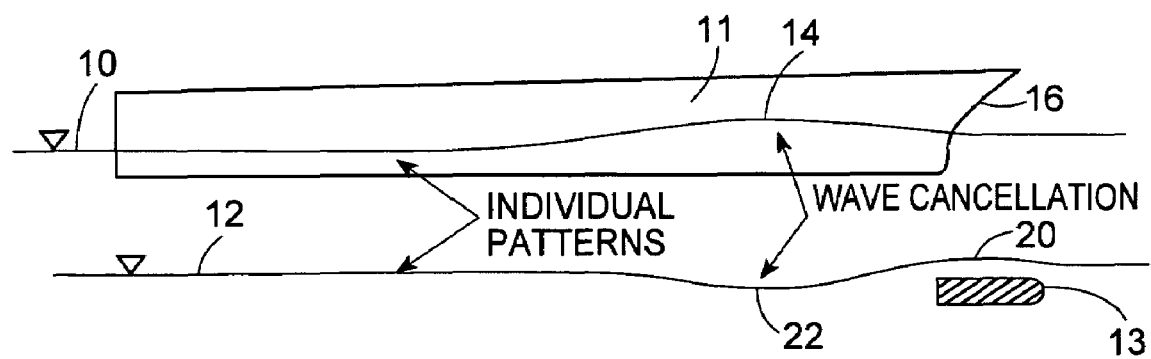
FIG. 2 is an exploded schematic elevational view of the hull and bulbous bow member of FIG. 1 and their respective wave form patterns.
Figure 7:
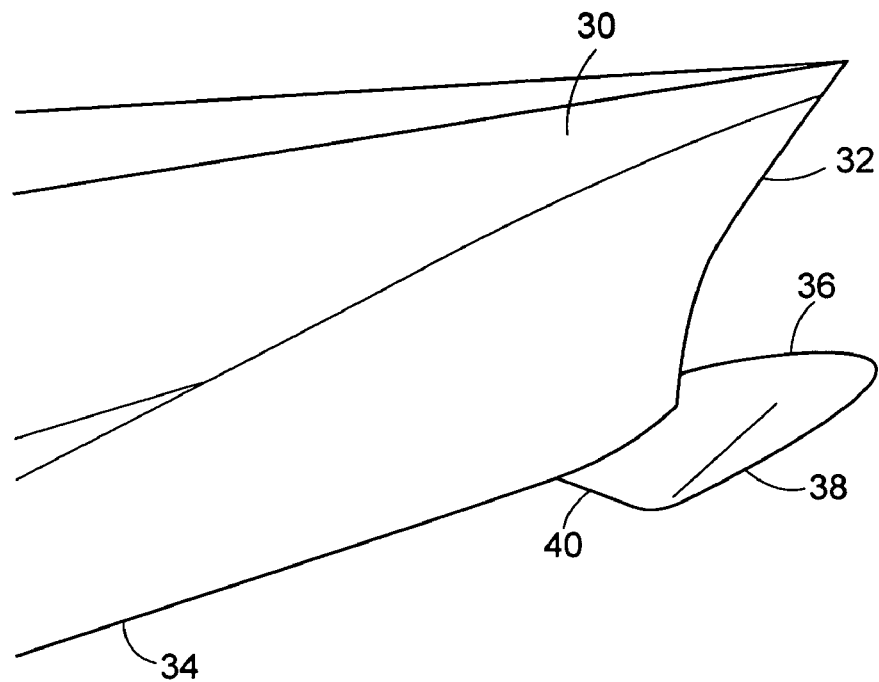
FIG. 7 is a perspective view of a Bow Lifting Body in accordance with th present invention.
Figure 8:
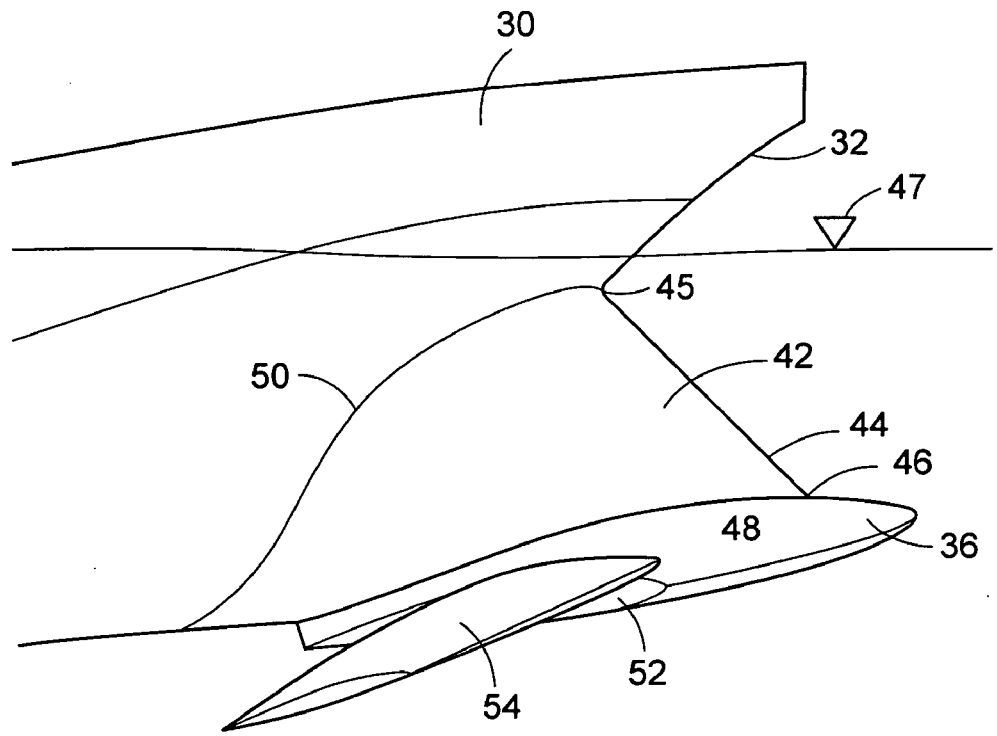
FIG. 8 is a perspective view similar to FIG. 7 of another embodiment of the invention
Figure 14:
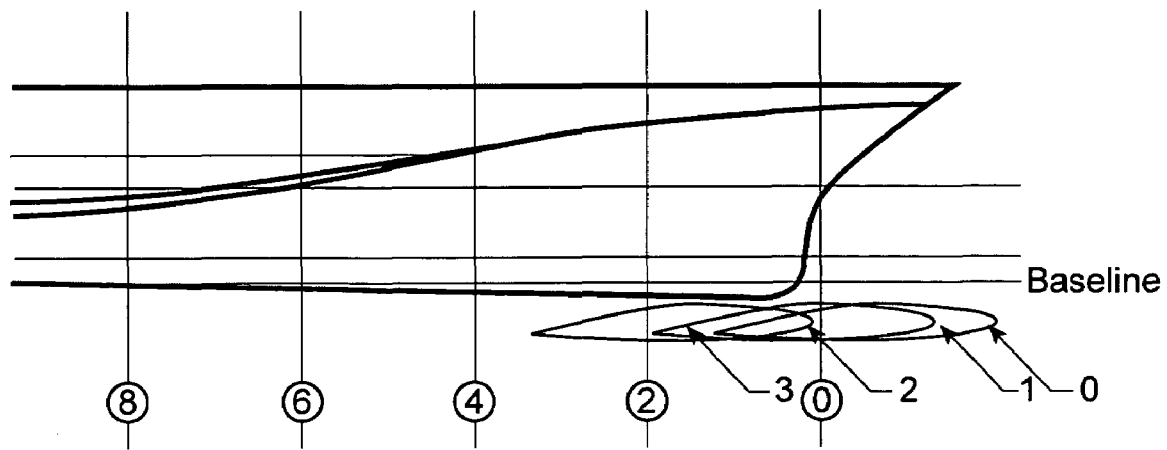
FIG. 14 is a schematic illustration showing specific possible locations for the lifting body relative to the hull.
Figure 15:
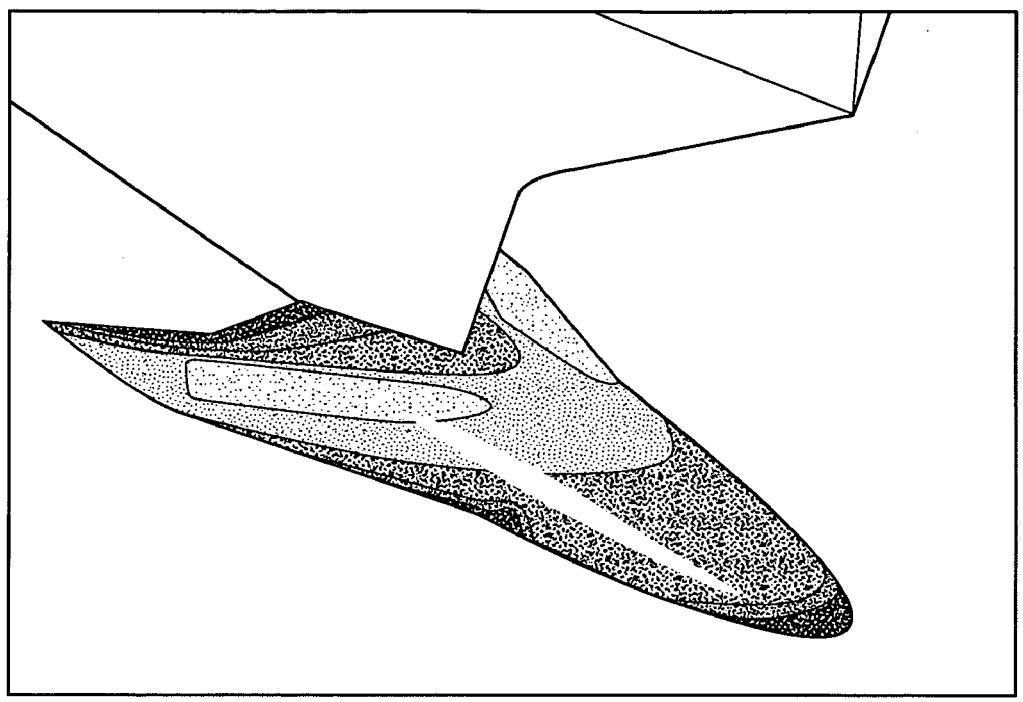
FIG. 15 is a perspective illustration of a BLB attached directly to the bow of a conventional hull and showing the water pressure distribution thereon at design cruising speed.

Referring now to the drawings in detail, and initially to FIGS. 7 and 8, two embodiments of watercrafts or ship hulls having a bow lifting body according to the present are illustrated. As seen in FIG. 7 a ship's hull 30 of conventional construction includes a tapered bow 32 and a bottom or keel 34. Secured to the bottom of bow 32 is a lifting body 36 formed in accordance with any of the embodiments of lifting bodies shown in FIGS. 1–6 and 13–27 of U.S. Pat. No. 6,263,819, although the embodiments of FIGS. 1 and 15 are currently preferred.

The lifting body 36 has a parabolic foil shape in longitudinal cross-section and a peripheral edge 38, referred to herein as the leading edge of the lifting body, which defines the widest portion of the body when viewed in plan. The edge is defined as a parabola substantially conforming to the conventional parabolic equation. The lifting body is generally symmetrical and longitudinal cross-sections taken parallel to its fore and aft axis are generally symmetrical as well but the scale of each cross-section decreases generally uniformly away from the fore and aft axis so that the hull tapers towards the edge parabola 38.

Lifting body 36 is secured to bow 32 in any convenient manner with its central fore and aft longitudinal axis aligned with the longitudinal axis of ship's hull 30. In the illustrative embodiment lifting body 36 has a straight stern or aft edge 40 which merges with keel 34.

FIG. 8 illustrates another embodiment of the invention in which the ship's hull 30 includes an integral forefoot structure 42 having a leading edge 44 which extends forward from a point 45 on bow 32 near the design water line 47 of the ship's hull to a point of intersection 46 with the surface 48 of lifting body 36 which is forward of the leading edge 32 of the hull at the design waterline. This point 46 also may be located forward of the mid point of the longitudinal length of the BLB. The forefoot 42 is preferably designed to have a cross section which is generally parabolic in plan at the forward portion thereof so that its width uniformly increases rearwardly of leading edge 44 to a maximum width and then tapers through successively smaller widths to join hull 30 at the joint 50.

Figure 3:
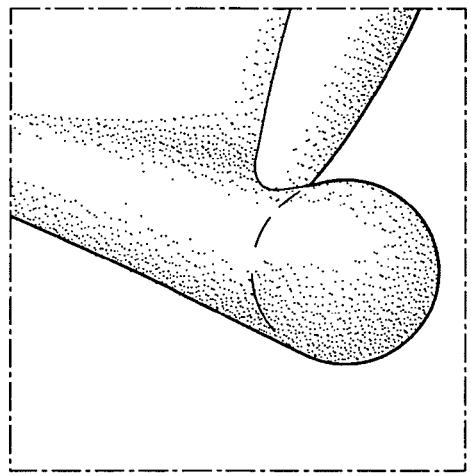
FIGS. 3–6 are perspective views of different bulbous bow configurations known in the prior art.
Figure 4:
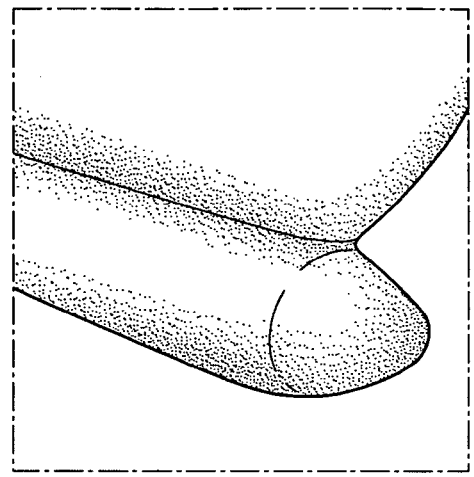
Figure 5:
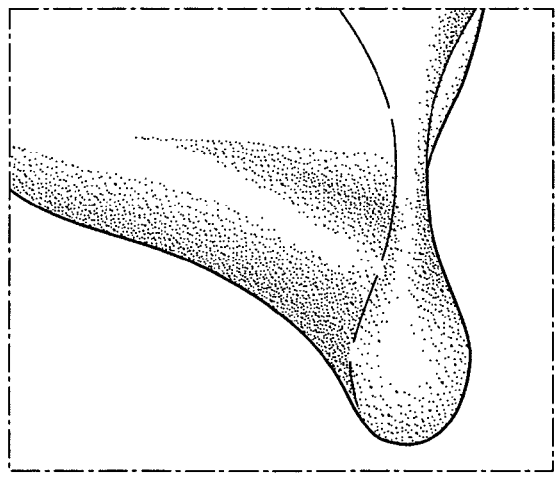
Figure 6:
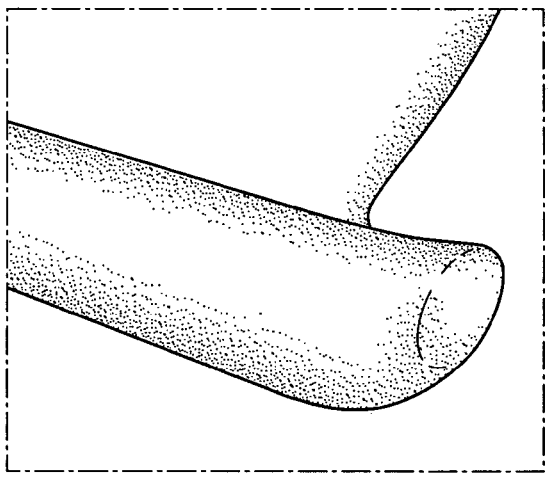

In the embodiment of FIG. 8, the leading edge 36 of the lifting body is terminated at opposed cross sections on opposite sides of the fore and aft axis, only one of which cross section 52 is seen in FIG. 3. A separate preferably adjustable control fin 54 is mounted at these cross sections on opposite sides of the lifting body.

Figure 17:
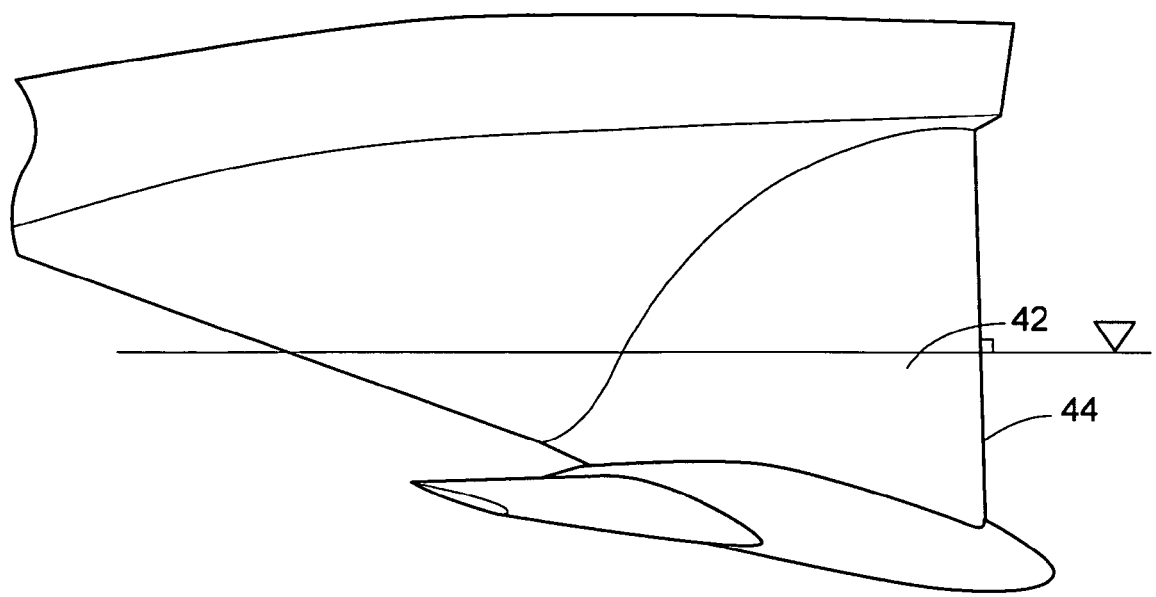
FIG. 17 is a view similar to FIG. 8 of a BLB mounted on a vertical bow of a hull.
Figure 18:
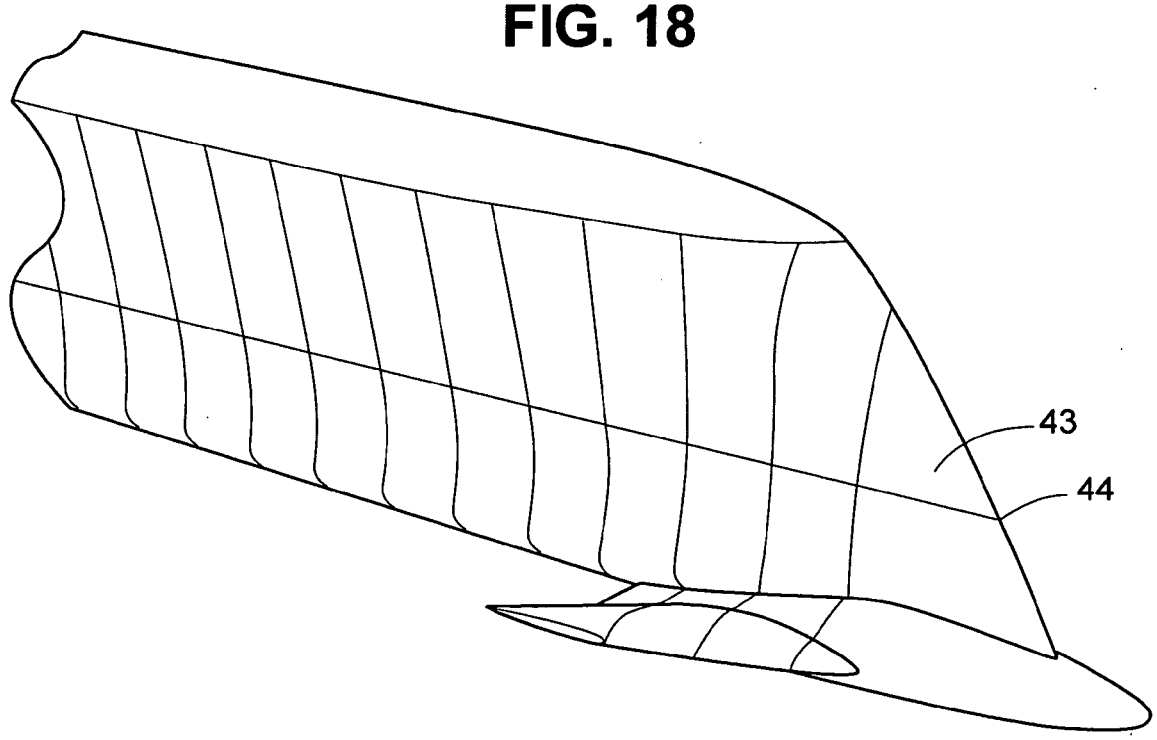
FIG. 18 is a view similar to FIG. 17 of a BLB mounted on a reversely inclined bow.

FIGS. 17 and 18 disclose two additional hull bow shapes on which the BLB of the present invention may be used. In the embodiment of FIG. 17 the forefoot structure 42 has a bow edge 44 which extends vertically relative to the water line. In the embodiment of FIG. 18 the BLB is mounted on the bottom of a bow whose leading bow edge 44 is reversely inclined relative to the forward direction of travel of the vessel.

Similar to the case with conventional bulbous bows, the size and placement of the bow lifting body must also be optimized.

As discussed above, the wave cancellation that is provided by a traditional bulbous bow is due to the nature of the wave train produced by the displacement of the bulbous bow and its proximity to the free surface. A BLB not only produces a wave train that is a product of its shape and proximity to the free surface, but also of the lift that is created. For instance, if a high lift hydrofoil with negligible displacement is located near the free surface, it will produce a wave train (often breaking waves) which is produced by lift alone, and not the displacement of the foil. The wave trough location behind a BLB thus can be much larger than a wave trough produced by a bulbous bow of the same displacement, length and proximity to the free surface because of the lifting body's generation of dynamic lift. Because the trough in the wave train behind a lifting body is much larger than that of a traditional bulbous bow, the wave cancellation effect is amplified and produced across a more broad range of speed. Dynamic lift increases with speed and therefore, its effect is evident over a wider speed range.

Figure 9:
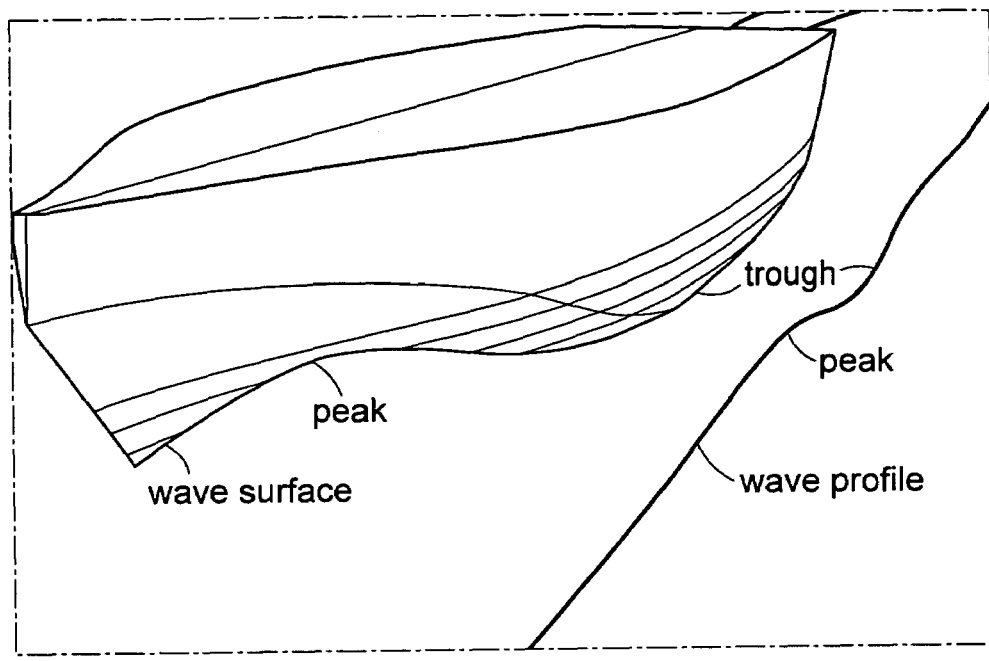
FIG. 9 is a perspective view of a ships hull showing the predicted wave pattern of the hull without a bulbous bow or BLB

Numerous model tests have been conducted using the modern method of computational fluid dynamics (CFD) to validate the predicted forces and free surface elevations produced, using a BLB. FIG. 9 shows the predicted wave height from CFD and FIG. 10 shows the measured wave height in a model test of a bare hull.

Figure 10:
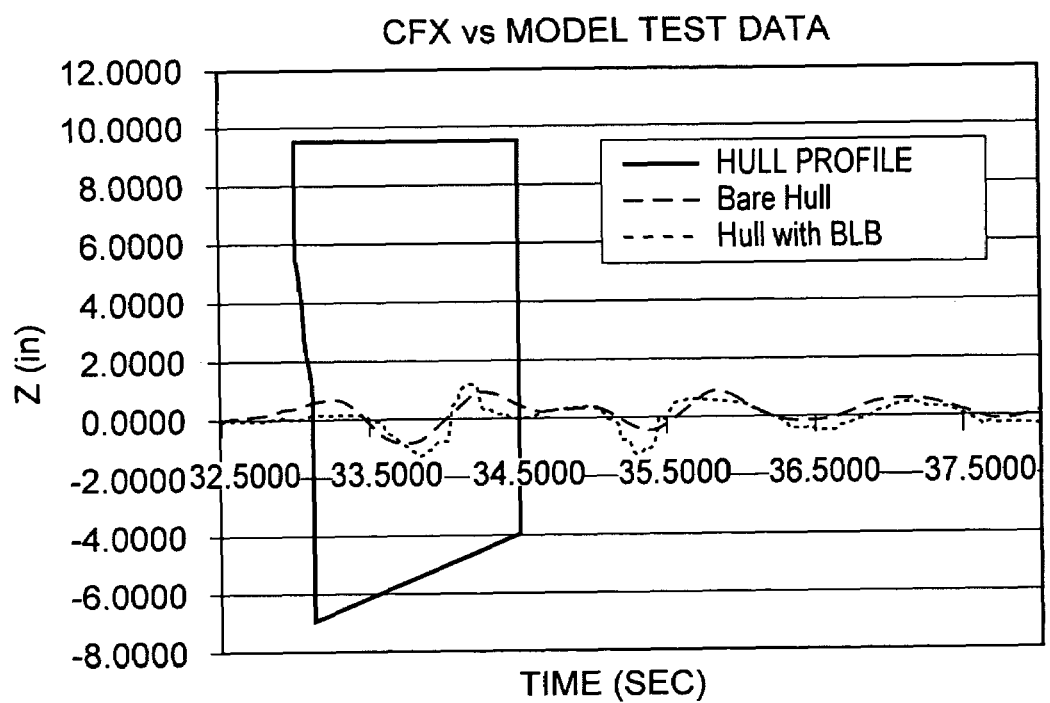
FIG. 10 is a graph reflecting the tech data results for the hull of FIG. 9.

More specifically the graph of FIG. 10 shows on the vertical axis the water level of a model test tank relative to a model hull; the dashed lines show the wave form relative to the hull for both a bare hull and the hull with a BLB (identified by letter Y), as noted on the chart; and a schematic side illustration of the bow of the hull H relative to the wave forms; and the horizontal or X axis represents time. The wave forms shown in the chart represent the measured wave form shown schematically in FIG. 9. Clearly the wave shown in FIG. 10 for the hull with BLB produces a lower bow wave than the wave formed by a hull without the BLB.

Figure 11:
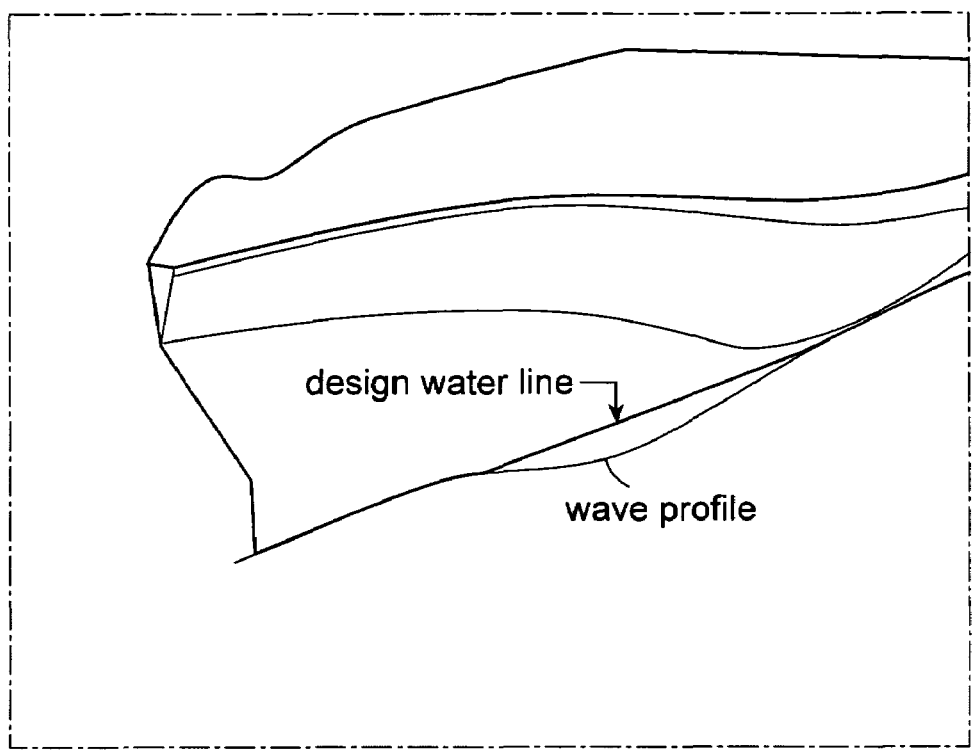
FIG. 11 is a perspective ship's hull similar to FIG. 9 and showing the free surface of the water relative to the vessel when using a BLB.
Figure 12:
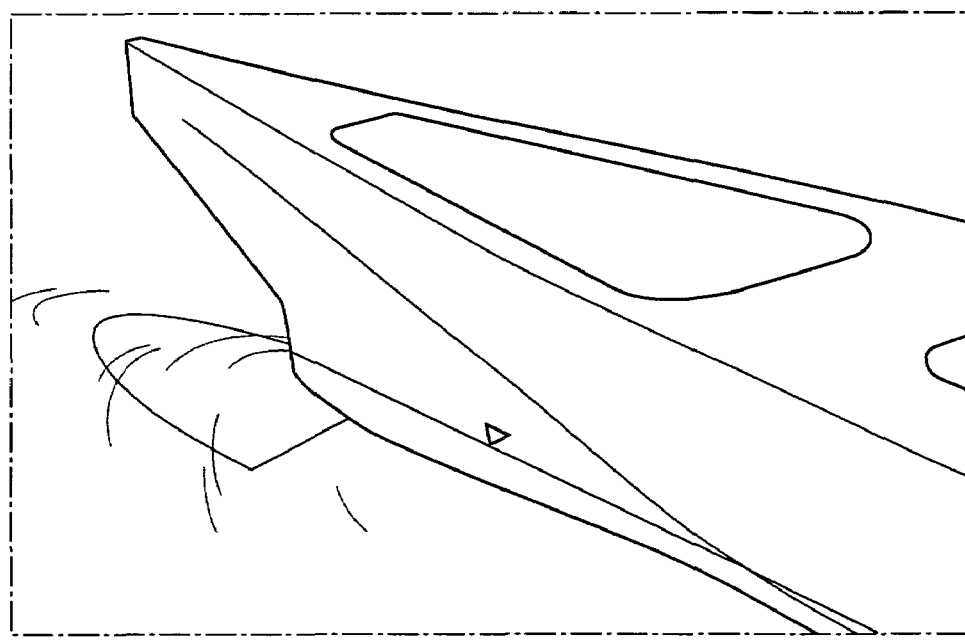
FIG. 12 is another perspective view of the hull of FIG. 11 but showing the BLB through the water.

Similar model tests have been conducted to validate the benefits of a BLB, including wave cancellation and increased efficiency. FIG. 11 shows the CFD predicted free surface and wave cancellation of a BLB while FIG. 12 shows the wave formed generated in a model test validation. The wave forms are essentially the same, and far flatter than under the base hull structure of FIG. 9.

Figure 13:
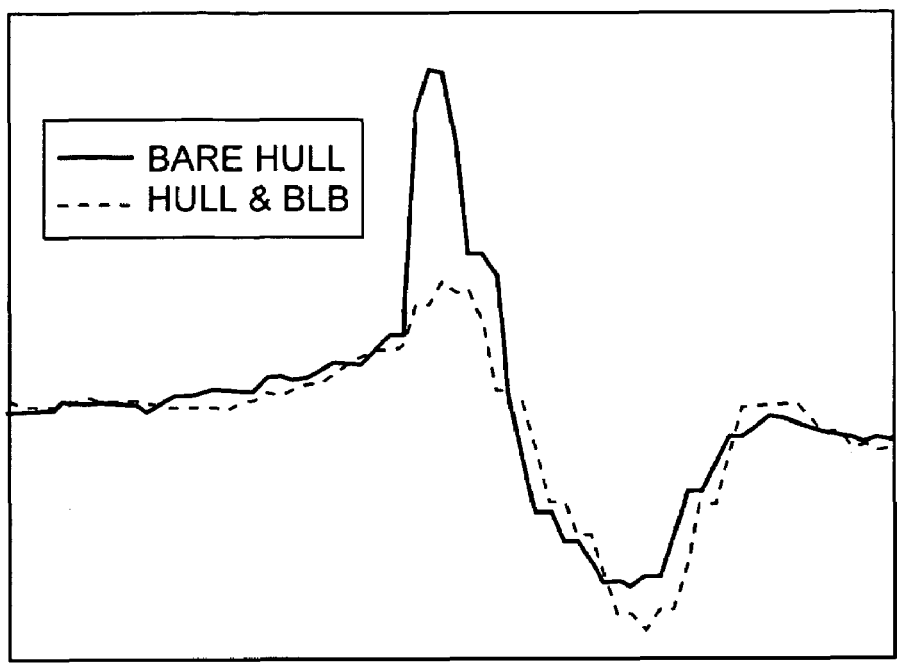
FIG. 13 is a chart showing a comparison of wave height creation by a bare hull with that of the same hull using a BLB.

This reduction in bow wave elevation due to the BLB was observed during model testing over the entire speed range due to the shape, placement and dynamic lift associated with the BLB. An example set of data comparing the bare hull, FIG. 9, and a run with the BLB FIG. 12 is shown as graphical data from a wave probe in FIG. 13. A wave probe is a sonic sensor placed a defined distance above the surface of water in a model test tank to read the wave height as a function of time. As the model hull moved passed the probe, the height of the wave pattern formed by the hull is measured. The results are shown in charts like FIG. 10 and can be compressed along the X axis, as seen in FIG. 13, or enlarged by the software to better examine the differences in the measured wave heights. FIG. 13 shows in a compressed form the first bow wave.

Another positive attribute of the present invention, as noted above, is that a lifting body typically has a higher efficiency than that of a hull alone. By adding a component with a higher efficiency (lift to drag ratio, L/D) the L/D of the entire system increases. Here too CFD studies have quantified these positive effects of adding a lifting body to the bow of a large ship. To find the optimum location on the hull for placement of the lifting body relative to the bow, numerous different locations, as shown and numbered 0 through 2 were considered through a speed range of 30–50 knots, as shown in FIG. 14. In each case, the hull was free to heave to the desired displacement of 2000 lton and the trim was fixed at zero degrees. The studies conducted established that the 0 position shown in FIG. 14 was the most efficient. That position increased not only the lifting body's efficiency but that of the entire vessel itself. That position was found to be optimum for efficiency and maximum lift. In conducting the study, the angle of attack was also varied and it was found that a two degree angle of attack achieved maximum efficiency for the entire configuration. The lifting body was directly attached to the hull by any convenient manner by lining up the keel of the hull with the trailing edge of the body. The longitudinal location remained the same as Location 0 and the angle of attack was fixed at two degrees.

Because the lifting body is intended to reduce the bow wave by wave cancellation and to elevate the hull and increase the overall efficiency, the area of low pressure on the upper surface of the lifting body should not be interrupted by large struts or other appendages. By attaching the lifting body as shown in FIG. 14, the low pressure area of the lifting body is not disturbed and the overall lift and efficiency is not compromised. The reduced wave pattern produced by this arrangement generates a reduction in wave making drag, and therefore reduces the overall drag of the vessel.

However, it has been found that the specific shape and location of the bow attachment structure is important to the optimization of dynamic lift and resistance. The preferred attachment system is shown in FIG. 8 wherein hull 30 is provided with a forwardly extending forefoot instead of a vertical or inwardly inclined bow below the waterline. The forefoot has a foil like shape when viewing the waterline from above, i.e. in plan. This foil shape causes the cross-section of the forefoot to increase in width aft of leading edge 44 and then decrease in width or thickness to the trailing edge which merges into the hull. This results in a reduction in drag and increased dynamic lift of the BLB. This foil shape of the optimized attachment strut increases the low pressure zone on the lifting body and the control wings and therefore increases lift by over 15%. This increase in lift comes free, with a decrease in drag due to the high pressure recovery area on the aft end of the strut.

Figure 16:
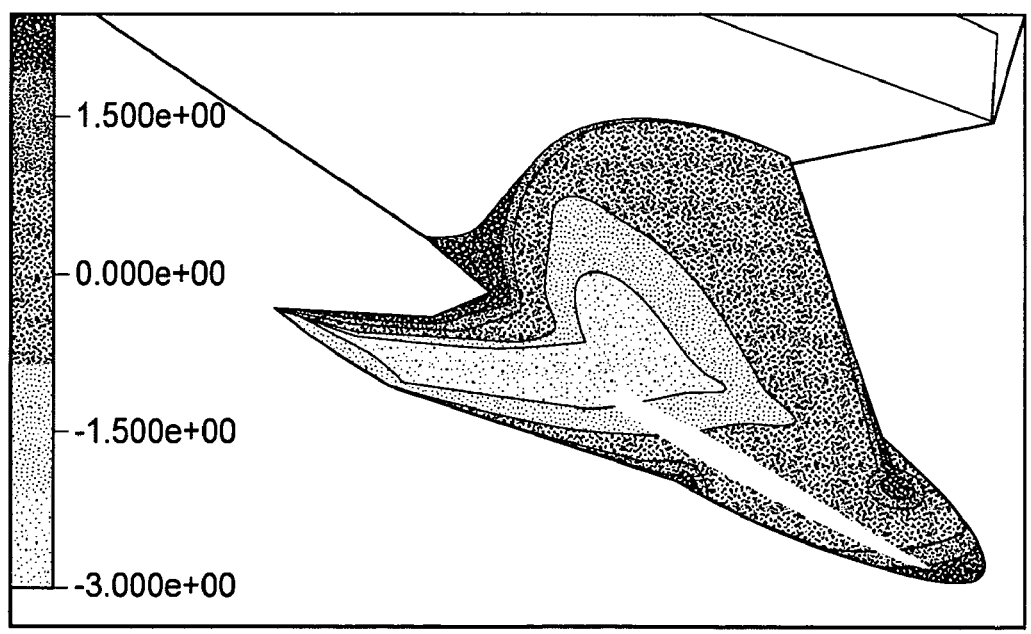
FIG. 16 is a perspective view similar to FIG. 15 showing the BLB connected to a hull having a forefoot.

This effect is shown by the schematic pressure illustrations of FIGS. 15 and 16. FIG. 15 shows a BLB according to the present invention using control fins 54 and being secured to a conventional hull. The speckled areas in the drawing represent pressure areas when the hull is operating at design speed, with the increasing density of speckling representing higher areas of pressure. FIG. 16 is a similar illustration for the forefoot attachment structure of FIG. 8. As seen therein the areas of low pressure in the embodiment of FIG. 16 on the wings or foils 54 and BLB 36 are increased in size as compared to the embodiment of FIG. 15 and high pressure is created aft of the forefoot, resulting in increased lift and reduced drag respectively.

Integrating the lifting body at the bow into the design of the ship allows the introduction of a motion control system such as the adjustable wings 54, with or without trailing edge flaps. With the implementation known active ride control systems for the wings and/or flaps, which include conventional or hydraulic or electric controls for varying the angle of attack of the wings or flaps, motion damping can be affected with benefits to added resistance in a sea way and crew effectiveness. With reduced motions speeds can be maintained and range is less affected by higher sea states. The lifting body of the bow adds damping to the overall ship, but the addition of an active control system will substantially increase its benefits to ship operations.

Although illustrative embodiments of the present invention have been described herein with reference to the accompanying drawings, it is to be understood that various changes and modifications may be effected therein by those skilled in the art without departing from the scope or spirit of this invention.

What is claimed is:

1. A watercraft hull having a bow, including a bow forefoot, and a lifting body attached to said bow forefoot and extending underwater forward from the forefoot; said lifting body providing dynamic lift to the hull when the watercraft is underway and having a leading edge portion conforming in plan to a first generally parabolic curve and in longitudinal cross-sectional planes to foil curves having vertices on the first parabolic curve and decreasing in thickness from the center of the lifting body to its edges.

2. A watercraft hull as defined in claim 1 wherein the leading edge of the bow forefoot is attached to the lifting body on the longitudinal forward half of the lifting body.

3. A watercraft hull as defined in claim 1 wherein said forefoot has a forward end, an aft end and a vertical cross section below the design waterline but above the lifting body that has a maximum vertical cross sectional area between said forward and aft ends and cross sectional areas of decreasing dimensions from said maximum vertical cross sectional area toward said aft end.

4. A watercraft hull as defined in claim 3 where the transverse cross section of the hull forefoot below the design waterline but above the attachment intersection of the forefoot with the lifting body is foil shaped in plan.

5. A watercraft hull as defined in claims 1, 2, 3 or 4 where, in profile view, the leading edge of the hull below the design waterline at the attachment intersection with the lifting body is forward of the leading edge of the hull at the design waterline.

6. A watercraft hull as defined in claim 5 where the leading edge of the bow of the hull above the waterline is forward of the hull leading edge at the design waterline.

7. A watercraft hull as defined in claims 1 or 2 where, in profile view, the leading edge of the hull at and below the design waterline is vertical to the design waterline.

8. A watercraft hull as defined in claim 1 where the leading edge of the bow of the hull above the waterline is forward of the hull leading edge at the design waterline.

9. A watercraft hull having a bow, including a forefoot and a lifting body attached to said forefoot extending underwater forwardly from the forefoot, said lifting body in plan view having foil shaped wings attached to its sides.

10. A watercraft hull as defined in claim 9 wherein said wings are movably mounted on said lifting body and said watercraft hull includes means for adjusting the angle of attack of the wings to the water flow.

11. A watercraft comprising a hull having a fore and aft longitudinal axis and a bow on said axis and a three dimensional low drag submerged lifting body secured to said bow, said lifting body having a fore and aft axis and an outer surface whose shape conforms a) generally in plan to a first parabolic curve centered on said fore and aft axis of the hull to define a leading edge for the lifting body in plan and b) in longitudinal cross-sectional planes parallel to said fore and aft axis, to symmetrical and graduated generally parabolic foil curves having vertices lying on the first parabolic curve, with the thickness of the parabolic foil shaped longitudinal cross-sectional planes decreasing away from the fore and aft axis to the edge of the lifting body.

12. A watercraft as defined in claim 11 wherein said watercraft has a keel and said bow of the watercraft includes a forefoot portion located below the design waterline of the watercraft, said lifting body being secured to said forefoot adjacent said keel.

13. A watercraft as defined in claim 12 wherein said forefoot portion has a water piercing leading edge which intersects the surface of said lifting body at a point forward of the longitudinal midpoint of said lifting body.

14. A watercraft hull as defined in claim 13 wherein said forefoot leading edge is angled forward from said bow at or above said waterline to its intersection with the lifting body, whereby the point of intersection of said leading edge to the lifting body is forward of the bow at the design waterline.

15. A watercraft as defined in any of claims 12, 13, and 14 wherein said forefoot has a generally foil shape in horizontal cross section whereby its width increases from said leading edge to a maximum width at a predetermined point aft of the leading edge and then decreases to a lesser width joining the hull at the aft end of the lifting body.

16. A watercraft as defined in any of claims 11, 12, 13, and 14 wherein said lifting body includes a pair of opposed foil shaped wings secured thereto and extending generally laterally of said fore and aft axis outward of the lifting body.

17. A watercraft as defined in claim 16 wherein said wings are movably mounted on said lifting body and said watercraft hull includes means for adjusting the angle of attach of the wings to the water flow.

18. A watercraft as defined in any of claims 12, 13, and 14 wherein said forefoot leading edge is angled forward from said bow at or above said waterline to its intersection with the lifting body, whereby the point of intersection of said leading edge to the lifting body is forward of the bow at the waterline, aft of the intersection of said leading edge with said surface of the lifting body.

19. A watercraft as defined in claim 18 wherein said wings are movably mounted on said lifting body and said watercraft hull includes means for adjusting the angle of attach of the wings to the water flow.

20. A watercraft as defined in any of claims 11, 12, and 13 wherein the bow of said hull is inclined downwardly and aft from a point above the design waterline of the hull to said design waterline.

21. A watercraft hull as defined in claims 11 or 12 where, in profile view, the leading edge of the hull at and below the design waterline is vertical to the design waterline.

22. A watercraft having a bow, including a bow forefoot portion, and a lifting body attached to said bow forefoot portion and extending forward from the forefoot portion; said forefoot portion having a forward end, an aft end and a vertical cross section below the design waterline but above the lifting body that has a maximum vertical cross sectional area between said forward and aft ends and cross sectional areas of decreasing dimensions from said maximum vertical cross sectional area toward said aft end and wherein the transverse cross section of the hull forefoot below the design waterline but above the attachment intersection of the forefoot with the lifting body is foil shaped in plan.

23. A waterecraft hull as defined in claim 22 where, in profile view, the leading edge of the hull below the design waterline at the attachment intersection with the lifting body is forward of the leading edge of the hull at the design waterline.

* * * * *